INVENTOR
K. A. FISHER
BY
Walter M. Hill
ATTORNEY

United States Patent Office 3,039,059
Patented June 12, 1962

3,039,059
PHASE COMPARATOR CIRCUIT HAVING INTEGRATING AND DIFFERENTIATING INPUT MEANS
Kenneth A. Fisher, Winston-Salem, N.C., assignor to Western Electric Company, Incorporated, New York, N.Y., a corporation of New York
Filed Dec. 10, 1957, Ser. No. 701,930
7 Claims. (Cl. 328—133)

This invention relates to phase comparators and more particularly to a phase comparator for comparing the relative phase between two periodic square wave pulse trains of the same frequency.

One obvious way of comparing the relative phase of two square waves is to impress the two waves on an oscilloscope circuit and observe the relative phase directly. Other methods which employ gated vacuum tube circuits and a meter are described by E. E. Brewer in an article entitled, "Measuring Phase Angles in Communication Circuits," published on page 36 of the December 1949 issue of Tele-Tech. The oscilloscope method involves elaborate and bulky apparatus. The other methods work well with symmetrical pulses but are not very satisfactory for single polarity or other unsymmetrical pulses. A simple method capable of reasonable accuracy is needed which will produce an output which may either indicate the relative phase or control apparatus in response to the relative phase or which may control one of the sources to maintain a fixed phase relationship between the two waves. The latter function is frequently employed for automatic frequency control.

It is an object of this invention to compare the relative phase of two square waves of the same frequency whether or not they be symmetrical about the time axis.

The object is achieved by this invention which comprises an amplifying means having two input terminals. An integrating means connects the reference square wave source to one of these input terminals and a differentiating means connects the other square wave source, whose phase is to be compared, to the other input terminal. An output circuit in this amplifier will produce an output which is a direct measure of the phase relation of the two sources.

The invention may be better understood by referring to the accompanying drawings, in which:

FIG. 1 is a block diagram showing the essential components comprising the combination of this invention;

FIG. 2 discloses the waveforms generated at various points in the diagram of FIG. 1 shown in a typical time or phase relation;

FIG. 3 discloses detailed circuits of a preferred embodiment of the invention;

Figure 1:
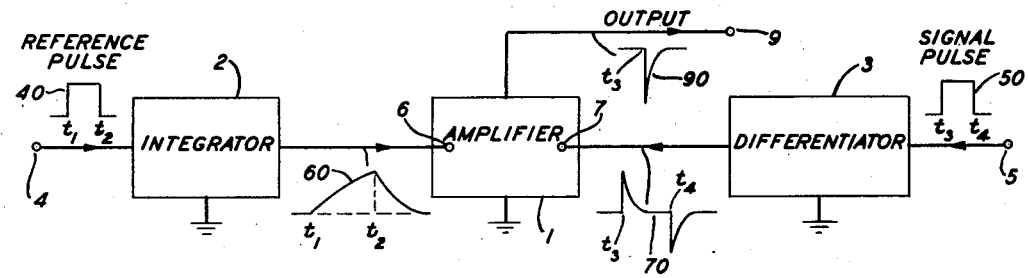

Referring to FIG. 1, the block 1 represents an amplifier having two input terminals 6 and 7 and an output terminal 9. A voltage appearing at output terminal 9 will be a measure of the relative phase existing between the reference square wave pulse 40 and the signal pulse 50. It is desired that the phase relationship between these two waves be continuously compared by this apparatus. The reference pulse 40 is applied to an integrator circuit 2 at input terminal 4 and the output terminal of integrator 2 is connected to the amplifier input terminal 6. As is well understood, the function of integrator 2 is to transform the reference pulse into a waveform of the type represented by wave 60 in FIG. 1. The signal pulse 50 is applied to the input terminal 5 of differentiator 3, the output of which is impressed on input terminal 7 of amplifier 1 and has the typical waveform 70. A requirement for amplifier 1 is that an appreciable output shall appear at terminal 9 only when signals appear simultaneously on both the input terminals 6 and 7. Thus a signal appearing on terminal 6 alone will produce no output. The signal appearing on input terminal 6 should be capable of varying the gain of the amplifier substantially in proportion to the instantaneous input voltage. If, during the time this signal appears on terminal 6, a differentiated signal 70 is impressed on terminal 7, the amplifier will transmit an inverted, amplified replica of the input signal as shown by waveform 90 in FIG. 1, its amplitude being determined by the gain at the instant signal 70 arrives.

Figure 2:
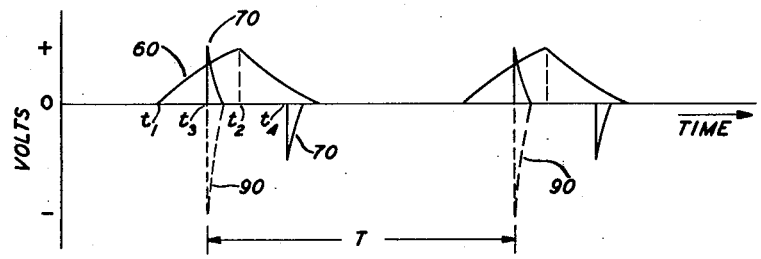
Figure 9:
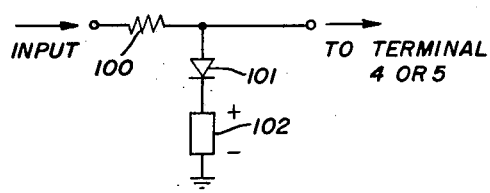
FIG. 9 is illustrative of one form of conventional limiter circuit for use with the circuits of FIGS. 1, 3, 4 and 5.

The time relationships of these waveforms may be more readily understood by reference to FIG. 2. If it be assumed that reference pulse 40 in FIG. 1 has its leading edge beginning at the instant $t_1$ and ending at the instant $t_2$ and that the signal pulse 50 begins at an instant $t_3$ which lies between times $t_1$ and $t_2$ and ends at time $t_4$, the relationships shown in FIG. 2 will take place. It may here be mentioned that the negative-going portion of waveform 70 in FIG. 1 is not transmitted by amplifier 1. Waveform 60 begins at terminal 6 at the instant $t_1$ and the gain of amplifier 1 is gradually increasing during the rising portion of this waveform. At time $t_3$ the amplifier gain will have a unique value somewhere between predetermined minimum and maximum values. At this instant the differentiated waveform 70 appears on input terminal 7 and since both signals are now impressed on the amplifier, the output waveform 90 is developed at output terminal 9. This is shown in dotted lines in FIG. 2. The peak value of waveform 90 will depend upon the gain of amplifier 1 which, in turn, is determined by the instantaneous value of the integrated waveform 60. It will now be apparent that if time $t_3$ coincides with the instant $t_1$, the output waveform 90 will have a low amplitude corresponding to the minimum gain of amplifier 1 and as time $t_3$ progresses toward time $t_2$ the output waveform 90 will be a measure of the relative phase between the two square wave pulses. The two square waves 40 and 50 should have constant amplitudes and may be so maintained by conventional means not shown in FIG. 1. A suitable conventional limiter circuit is shown in FIG. 9 and will be briefly described later. As mentioned above, the negative-going portion of the differentiated waveform 70, shown below the time axis in FIG. 2 and which appears at the instant $t_4$, will not be amplified by amplifier 1. Since both the reference pulse and the signal pulse are periodic in nature, the waveforms just described will be repeated after time T. Time T is thus the period of the square waves.

Figure 3:
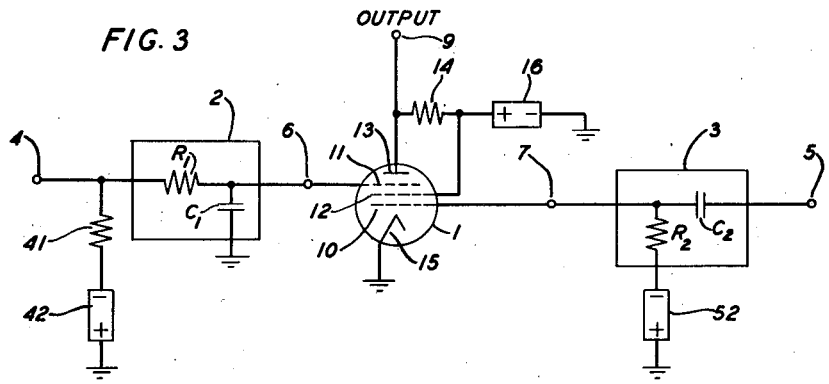

The circuit shown in FIG. 3 is a practical, preferred embodiment of the invention for realizing the functions described for the various components of FIG. 1. In this figure, amplifier 1 is preferably a sharp cutoff pentode having a variable transconductance as a function of the bias on its third grid 11. As shown, this pentode comprises two grids 10 and 11, each capable of control functions, a screen grid 12, an anode 13 and a cathode 15. As in FIG. 1, the reference pulse is impressed on input terminal 4 and integrated by a simple integrating network comprising series resistor $R_1$ and shunt capacitor $C_1$. Bias to grid 11 is provided by bias source 42 through coupling resistor 41 and integrator resistor $R_1$. The signal pulse 50 is impressed on input terminal 5 and reaches control grid 10 by way of a simple differentiating network 3 comprising a series capacitor $C_2$ and a shunt resistor $R_2$. Grid 10 is biased to cutoff by means of bias source 52 through the differentiator resistor $R_2$. In this embodiment, grid 11 is used primarily to control the transconductance of pentode 1. The plate 13 is supplied with power from the direct current source 16 through a suitable plate resistor 14. The output appearing at terminal 9, as described above, will be a measure of the relative phase between the two square wave input voltages.

Figure 4:
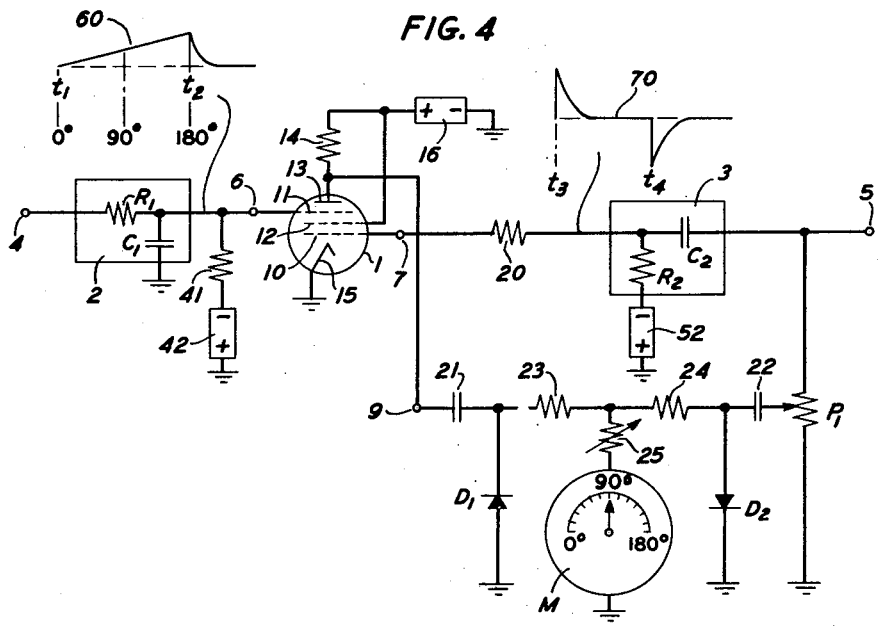
FIG. 4 shows the circuit of FIG. 3 with a convenient direct reading indicator circuit.

The circuit of FIG. 4 is essentially the same as that shown in FIG. 3 except that a balanced indicator circuit is shown for indicating phase. The integrated waveform 60 coming from network 2 is impressed on the grid 11, while the differentiated waveform 70 is impressed on grid 10. If the peak value of the differentiated wave 70 may exceed the bias provided by source 52, a protective resistor 20 should be added to limit the peak voltage of grid 10 near ground potential. The negative-going output pulse voltage appearing at terminal 9 is applied to rectifier $D_1$ through capacitor 21 whereby a positive voltage with respect to ground appears at the upper terminal of diode $D_1$. This voltage is applied to meter M through a resistor 23. It is preferred that meter M be of the zero center type so that zero current through meter M may represent a 90-degree phase relation. The pulse amplitude at terminal 9 must correspond to a time midway between times $t_1$ and $t_2$ in order that it may represent the 90-degree phase angle. To obtain zero current at this pulse amplitude, an eqcal and opposite potential must be developed across a similar diode $D_2$ connected in a conventional balancing circuit completed by diode $D_2$ and resistor 24.

Figure 5:
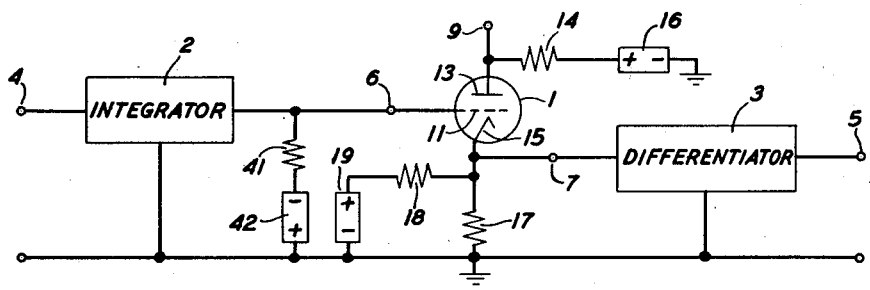
FIG. 5 shows an alternative form of the invention using a different type of amplifier tube.

In accordance with conventional practice, resistors 23 and 24 are preferably made of equal size. A convenient source of reference voltage may be derived from the constant amplitude input voltage at terminal 5 by connecting potentiometer $P_1$ to that terminal and to ground as shown in FIG. 4. A capacitor 22 connects the slider of this potentiometer to diode $D_2$ so that the slider may be adjusted until a zero deflection corresponding with 90-degrees phase relation appears on meter M when the phase relationship between the voltages applied on terminals 4 and 5 is 90-degrees as established by conventional calibrating techniques well known in the art. A variable resistor 25 connected in series with meter M is adjusted to provide positive and negative deflections corresponding to the zero degree and 180 degrees phase relations. For example, the rectified outputs of diodes $D_1$ and $D_2$ will differ by a definite amount when the phase relation is 180 degrees. This may cause a positive deflection of meter M which is adjusted to read 180 degrees by variable resistor 25. When using this type of indicator, it is not necessary that bias source 42 provide a cutoff voltage for grid 11. In fact, it is preferred that this voltage be somewhat less than cutoff voltage so as to take advantage of maximum transconductance linearity An alternative arrangement is shown in FIG. 5 wherein a triode is used for amplifier 1 in place of a pentode. This triode should be of the sharp cutoff type and possess a variable transconductance in its cutoff region. Grid 11 is given a negative potential with respect to ground equal to the cutoff voltage of the triode. This is supplied by source 42 through coupling resistor 41. The cathode 15 has a positive static bias potential also equal to the normal cutoff voltage for triode 1. This is supplied from a source 19 and resistors 17 and 18, the latter two resistors forming a potential divider with the cutoff voltage appearing across resistor 17. It will thus be apparent that triode 1, in the absence of signals, is normally biased to a voltage substantially twice its normal cutoff voltage. As before, the grid of this tube, connected to the integrator circuit 2, has as its primary function the control of the transconductance of tube 1. The signal pulse coming through differentiator 3 is impressed on the cathode 15 and the output from terminal 9, connected to anode 13, will be a measure of the relative phase between the two input square waves. Aside from the differences in the input connections, this circuit otherwise operates in the same manner as the circuit of FIG. 3.

As indicated above, the output voltage appearing at terminal 9 may be utilized for several purposes. It may be used to directly indicate the relative phase between the two input voltages, or it may be used to control some apparatus in response to this phase relationship, or it may be used to maintain a desired phase relationship between these two voltages. In this latter case, mention may be made of the fact that the signal square wave may be initiated from a generator whose frequency is controlled by a conventional reactance tube circuit well known in the art and frequently used for automatic frequency control purposes. The output pulses from terminal 9 are merely filtered and applied as a control voltage to the reactance tube in accordance with conventional practice.

Figure 6:
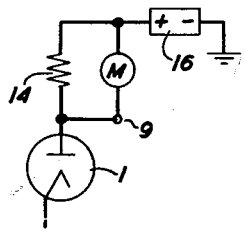
FIGS. 6, 7 and 8 show other typical meter circuit connections suitable for use in the practice of this invention.
Figure 7:
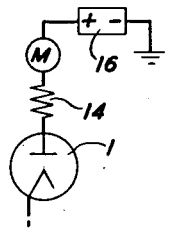
Figure 8:
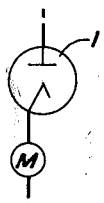

Other simple circuits may be used with this invention for indicating phase where the biases on both input grids provide substantial cutoff. Examples of such circuits are shown in FIGS. 6, 7 and 8. In FIG. 6, an ordinary D'Arsonval galvanometer M is shown connected between output terminal 9 and the positive terminal of source 16, thereby connecting this meter in shunt with the load resistor 14. So long as there is no coincidence of input pulses, the amplifier 1 is cut off and consequently the meter deflection is zero. This is also true when the two square waves are exactly in phase, i.e., when time $t_3$ of FIG. 2 coincides with time $t_1$. These times correspond with the rising portions of the square waves 40 and 50 in FIG. 1. However, as the phase relationship changes, a series of output pulses approximating those shown, for example by pulses 90 in FIG. 2, will appear at the output terminal 9 of amplifier 1 to cause current pulses through the meter. Since this type galvanometer responds to the average value of these pulses, it will be evident that its indication will be a measure of the desired phase relationship. Instead of connecting the meter M in shunt with the load resistor 14, it may be connected in series with the anode circuit as shown in FIG. 7 or in series with the cathode as shown in FIG. 8. In either case, the operation is essentially the same as described for FIG. 6.

FIG. 9 discloses a limiter circuit (sometimes called a clipper circuit) of conventional design and is of the type disclosed in United States Patent No. 1,200,796, granted October 10, 1916 to H. D. Arnold. Similar circuits are disclosed in Radio Engineering by Terman, 3rd edition (1947), page 597, and in Radar System Engineering—Ridenour, Radiation Laboratory Series, volume 1 (1947), page 504. Another type of limiter circuit suitable for use in the practice of this invention is illustrated in United States Patent No. 1,830,240 granted November 3, 1931 to E. Peterson. Still other limiter circuits are known to those skilled in this art and any of them may be used to supply either the reference pulse or the signal pulse where it is subject to voltage variation. Of course, the source of the square wave itself may inherently include a means to provide the limiting function so that a separate limiter is unnecessary. Such a source would be a conventional multivibrator circuit powered by a regulated power source. Briefly, with reference to FIG. 9, the input voltage is fed to a circuit comprising resistor 100, diode 101 and back bias source 102. The output, taken from the junction between the resistor 100 and diode 101, may be applied to either terminal 4 or 5 of any of the FIGS. 1, 3, 4 or 5.

The operation of such circuits is very well known but for the sake of completeness it will be briefly described. As a square wave pulse is impressed on this circuit, the output voltage rises on the leading edge of the pulse until it substantially equals the voltage of the back bias source 102. At this instant diode 101 suddenly becomes conductive to limit all further voltage rise to the back bias voltage level. On the trailing edge of the square wave pulse the output voltage drops with the applied voltage as it lowers below the back bias voltage level where diode 101 suddenly becomes non-conductive.

While the preferred embodiment of this invention discloses rather simple and elementary forms of integrating and differentiating circuits, it is quite evident that other types of integrators and differentiators well known in the art, as for example differentiating and integrating amplifiers, may be used in their stead. The only requirement is that they produce waveforms generally of the types shown in FIG. 1. It will also be equally clear to those skilled in the art that other types of amplifier circuits may be devised meeting the requirements set forth in the above description of this invention. These and other modifications obvious to those skilled in the art should be considered equivalents within the scope of this invention.

What is claimed is:

1. A square wave phase comparator circuit comprising an amplifying means having two input terminals and an output terminal, said amplifier having a variable gain characteristic in response to the voltage applied to at least one of its input terminals, means including a constant voltage limiting means and an integrating means for connecting a reference square wave source to one of said input terminals, means including a constant voltage limiting means and a differentiating means for connecting a square wave source whose phase is to be compared to the other input terminal, whereby the voltage at said output terminal is a measure of the phase relation of said two sources, and voltage responsive means connected to said output terminal for indicating said relative phase.

2. The combination of claim 1 wherein said amplifying means comprises a pentode having two control electrodes comprising said two input terminals and an anode comprising said output terminal.

3. The combination of claim 2 wherein said pentode has a sharp cutoff characteristic to provide a variable gain in response to said integrated reference square wave.

4. The combination of claim 2 and bias means connected to each of said control electrodes, said means providing substantial cutoff to at least one of said electrodes in the absence of an input wave impressed thereon.

5. The combination of claim 1 wherein said integrating means comprises a series-connected resistor and a shunt-connected capacitor and said differentiating means comprises a series-connected capacitor and a shunt-connected resistor.

6. The combination of claim 1 wherein said amplifying means comprises a sharp cutoff triode having a variable transconductance in the region of cutoff, said triode having a grid and a cathode comprising said two input terminals and an anode comprising said output terminal.

7. The combination of claim 6 and bias means for both said cathode and said grid, each sufficient to substantially bias said triode to cutoff whereby said triode is substantially cut off in the absence of input waves simultaneously impressed on said two input terminals.

References Cited in the file of this patent

UNITED STATES PATENTS

| | | |
|---|---|---|
| 2,493,648 | Watton | Jan. 3, 1950 |
| 2,499,534 | Sorber | Mar. 7, 1950 |
| 2,579,473 | Chatterjea | Dec. 25, 1951 |
| 2,589,833 | Longmire | Mar. 18, 1952 |
| 2,609,501 | Guthrie | Sept. 2, 1952 |
| 2,634,346 | Hoeppner | Apr. 7, 1953 |
| 2,782,355 | Wilcox | Feb. 19, 1957 |
| 2,837,642 | Schenck | June 3, 1958 |

OTHER REFERENCES

Electronics, Feb. 1954, pages 188, 189, 190 and 192, "Phase-Selective Detectors," Schafer.